United States Patent
Marx et al.

(10) Patent No.: US 8,098,570 B2
(45) Date of Patent: Jan. 17, 2012

(54) SPECTRUM CHARACTERIZATION FOR COMMUNICATION EQUIPMENT

(75) Inventors: François Marx, Meylan (FR); Denis Callonec, Tencin (FR)

(73) Assignee: France Telecom, Paris (FR)

( * ) Notice: Subject to any disclaimer, the term of this patent is extended or adjusted under 35 U.S.C. 154(b) by 935 days.

(21) Appl. No.: 11/991,790

(22) PCT Filed: Sep. 13, 2006

(86) PCT No.: PCT/FR2006/002099
§ 371 (c)(1),
(2), (4) Date: Mar. 11, 2008

(87) PCT Pub. No.: WO2007/031646
PCT Pub. Date: Mar. 22, 2007

(65) Prior Publication Data
US 2010/0290334 A1 Nov. 18, 2010

(30) Foreign Application Priority Data
Sep. 13, 2005 (FR) ...................................... 05 09344

(51) Int. Cl.
*H04L 11/00* (2006.01)
(52) U.S. Cl. ........................................................ 370/210
(58) Field of Classification Search .................. 370/203, 370/208, 310.2, 319, 320, 321, 322, 328, 370/330, 335, 341, 342, 344, 343, 349
See application file for complete search history.

(56) References Cited

U.S. PATENT DOCUMENTS

| | | | | |
|---|---|---|---|---|
| 5,694,396 A | * | 12/1997 | Firouzbakht et al. | 370/480 |
| 5,838,732 A | * | 11/1998 | Carney | 375/297 |
| 5,940,384 A | * | 8/1999 | Carney et al. | 370/347 |
| 6,070,056 A | * | 5/2000 | Sakoda et al. | 455/67.11 |
| 7,403,577 B2 | * | 7/2008 | Kumar | 375/324 |
| 2004/0258014 A1 | | 12/2004 | Ro et al. | |

FOREIGN PATENT DOCUMENTS

| | | |
|---|---|---|
| EP | 1 139 564 | 10/2001 |
| WO | WO 96/10300 | 4/1996 |
| WO | WO 00/65789 | 11/2000 |

OTHER PUBLICATIONS

Vallet, Robert, et al., "Fraction Spaced Multi-Carrier Modulation," Wireless Personal Communication, vol. 2, p. 97-103, 1995. XP 000589614.

Rhee, Wonjong, et al., "Performance Comparison of OFDM and Multitone with Polyphrase Filter Bank for Wireless Communications," IEEE, Vehicular Technology Conference, p. 768-772, 1998.

* cited by examiner

*Primary Examiner* — Brenda H Pham
(74) *Attorney, Agent, or Firm* — McKenna Long & Aldridge LLP

(57) ABSTRACT

The invention concerns the processing of digital signals, in particular spectral scanning upon reception of a signal. Said processing includes multicarrier shape filtering (12) applied to a received signal prior to computing a Fourier transform (13) applied to the received signal thus filtered. The invention is advantageously useful for dynamic spectrum allocation in a context of radio communication of content.

6 Claims, 4 Drawing Sheets

FIG. 5
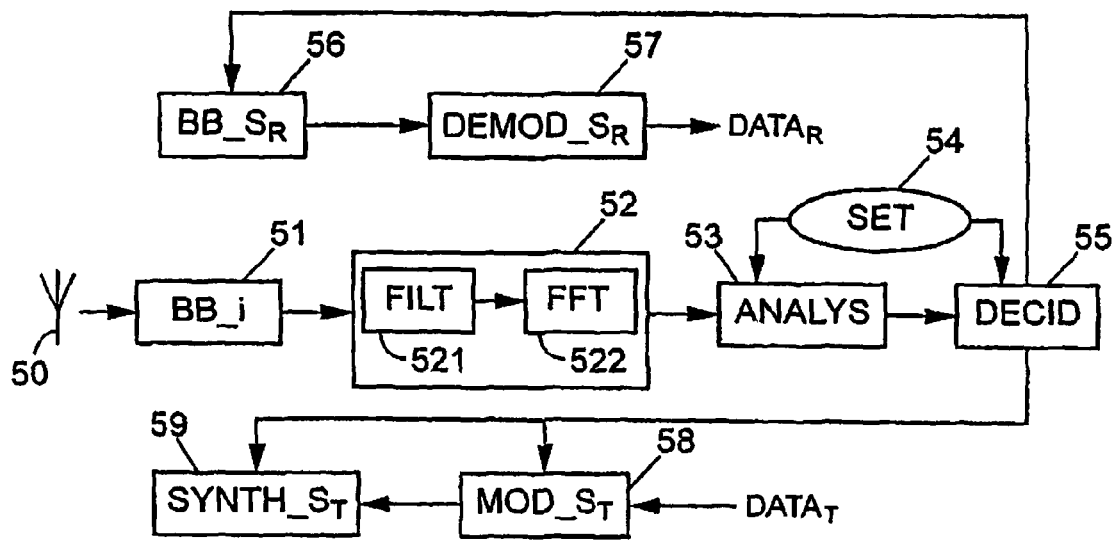
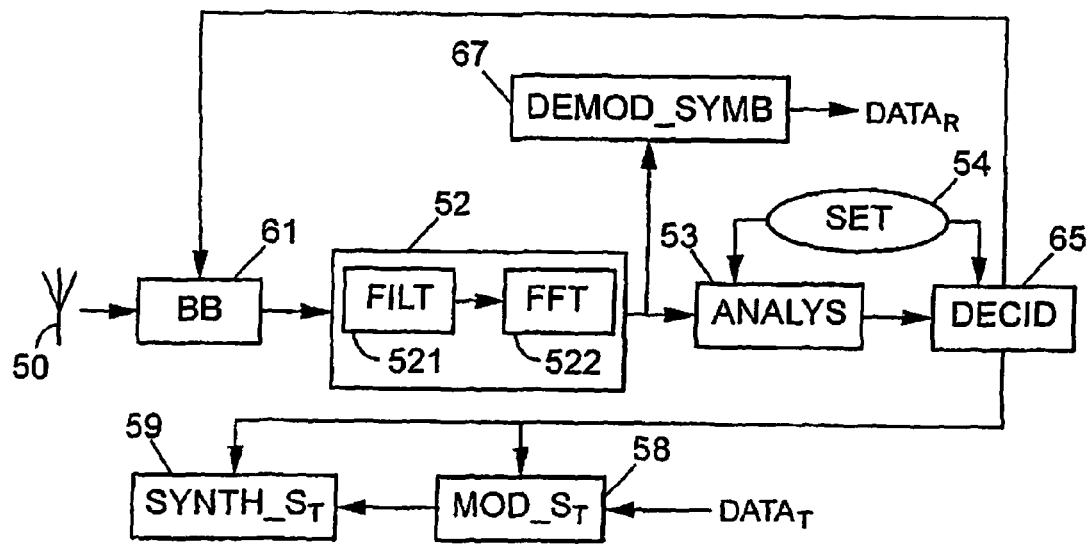
FIG. 6

SPECTRUM CHARACTERIZATION FOR COMMUNICATION EQUIPMENT

This application claims the benefit of PCT Patent Application No. PCT/FR2006/002099, filed Sep. 13, 2006, which claims the benefit of French Patent Application No. 05 09344, filed Sep. 13, 2005, which are both hereby incorporated by reference in their entirety.

FIELD OF INVENTION

The present invention relates to fine spectrum characterization, in particular for digital communication equipment, in a radio or wired context.

BACKGROUND OF THE INVENTION

The invention finds an advantageous, but non-restrictive, application in OFDM modulation communication, in particular in cognitive and frequency-agile communication.

The term "cognitive communication" is derived from the English term "cognitive radio" and designates intelligent communication in which the equipment is capable of changing frequencies dynamically and over a wide range of frequencies (e.g. several GHz, hence also the term "frequency-agile").

Moreover, it is recalled that OFDM modulation (standing for "Orthogonal Frequency Division Multiplexing") is used for splitting a high bitrate binary train into a multitude of low bitrate modulated trains (or channels). Each of these subchannels is modulated by a different frequency, the spacing between frequencies remaining constant. These frequencies constitute an orthogonal base in which the OFDM signal spectrum has optimal occupancy in the allotted band. Thus, OFDM modulation distributes a high bitrate over a series of orthogonal low bitrate modulated subcarriers. These subcarriers generally use narrow frequency bands.

One of the purposes of the present invention is preferentially to enable communication equipment to:
measure and characterize spectral occupancy over a range of frequencies in which this equipment is itself capable of operating, e.g. in an OFDM context, and
decide, according to the communication need and spectrum analysis, on the band in which to work.

The present invention thus provides fine spectrum characterization of frequencies in particular for cognitive and frequency-agile communication equipment. It uses spectral scanning for this purpose. However, the present application uses the term "scanning" to mean the act of running through the spectrum, in a general way, whether for searching for a free band in the spectrum, or for detecting interference, etc.

Spectral scanning associated with a decision system has been proposed, particularly in documents such as WO-96/10300.

Digital spectral scanning is generally done with the aid of a Fourier transform, with, in particular, capture of the digital samples in a frequency band and a Fast Fourier Transform (or "FFT" hereafter). The result of the FFT corresponds to the signal spectrum in the band considered.

However, analysis by simple FFT does not faithfully represent the spectra present and therefore does not enable reliable identification and characterization of the corresponding signals. One of the possible reasons for this drawback would be associated with the rectangular window for time analysis. A pure sine wave, whose frequency does not exactly match one of the scanning FFT carrier frequencies, returns energy over a large number of carriers in a ratio with the energy of the strongest carrier which is neither controllable, nor predictable from one piece of equipment to another.

In addition, a conventional spectrum analyzer is extremely costly, chiefly for the following reasons:
it has to cover a very wide range of frequencies,
it has to cover variable resolutions,
finally it has the function of presenting the spectrum measured according to a large number of parameters.

The present invention aims to improve the situation.

SUMMARY OF THE INVENTION

To this end, for spectral scanning, it proposes preceding the Fast Fourier Transform computation by multicarrier shaping filtering (shaping filtering carried out on each of the carriers) in order to decide, according to the result obtained, whether or not a signal is present on the band considered and, where necessary, finely characterizing it (nature of the signal, pattern, level, etc.).

In more general terms, the invention is primarily intended for a method of spectral scanning upon reception of a digital signal, this method comprising a Fourier transform computation. According to the invention, this computation is preceded by multicarrier shaping filtering.

Advantageously, a mode of embodiment of the multicarrier shaping filter is a polyphase filter.

Thus, according to one of the advantages of the invention, it is possible to finely characterize the components of an ambient spectrum, in a reproducible and deterministic way over time, for the same equipment or for several instantiations of equipment.

According to another advantage of the invention, it is possible to take advantage of a multicarrier reception chain with a filter bank, already present in communication equipment, for being able to perform both the spectral scanning according to the invention and the conventional stages of receiving a digital signal, in particular demodulation of the signal received. Nevertheless, this measure, although advantageous, is in no way obligatory.

The invention is therefore also intended for a spectral scanning chain according to the invention, together with communicating equipment comprising such a chain, which includes a multicarrier shaping filter bank upstream from a Fourier transform computation module, and preferentially identification modules, for deciding whether or not a signal is present in the spectrum considered and, where necessary, its characterization. The detailed description below gives an example of embodiment of such signal detection, this signal being pre-specified (its spectral signature being known in the example described).

The invention is also intended for communicating equipment (e.g. a base station or a terminal) comprising the spectral scanning chain according to the invention, together with a communication system, advantageously in a cognitive and frequency-agile communication context, bringing into play at least one base station and/or at least one terminal, as communicating equipment according to the invention.

The invention may advantageously use pre-established signal signatures, rules for characterizing and detecting these signals, and, in particular, a computer program for implementing the invention. The present invention is also intended for such a computer program, as well as a programmable component (e.g. an integrated circuit, a DSP module, etc.) including a memory storing such a program. Such a component or integrated circuit may comprise the aforementioned scanning chain alone, or the scanning chain in combination with all or part of the communicating equipment means.

BRIEF DESCRIPTION OF THE DRAWINGS

Other characteristics and advantages of the invention will emerge on scrutiny of the detailed description below, and the accompanying drawings in which:

FIG. 5 illustrates a first possible mode of embodiment of a piece of communication equipment implementing the processing according to the invention, in which the chain for demodulating a desired signal and the scanning chain are separate, FIG. 6 illustrates a second possible mode of embodiment of a piece of communication equipment implementing the processing according to the invention, in which, advantageously, the chain for demodulating the desired signal and the scanning chain are common but do not operate at the same time.

MORE DETAILED DESCRIPTION

In the detailed description below, the context of the invention, given by way of example, is scanning by OFDM demodulation filtered by IOTA polyphase multicarrier shaping. The principle also applies to any other multicarrier shaping (including Nyquist polyphase multicarrier shaping).

This processing is applied to a received digital signal. This signal can therefore be received directly in digital form (e.g. in digital broadcasting or communication, such as a digital television signal). As a variant, it can also involve a signal that has been received in analog form, then digitized.

The detailed description below uses the following notations:

L is the shaping function truncation length of a polyphase filter used for spectral scanning (e.g. an IOTA, Nyquist or other type of function);

M is the number of time samples from the duration equivalent to the duration of a symbol in OFDM/IOTA modulation;

N is the number of subcarriers provided for in the scanning (it being understood that from the total band scanned it is possible to set the resolution of the analysis);

$g_k$ are the time samples of the shaping function;

$r_k$ are the time samples of the signal received in the analysis band;

$R_k$ are the time samples filtered from this signal; and $a_m$ are the coefficients of this signal in the frequency domain.

Figure 1:
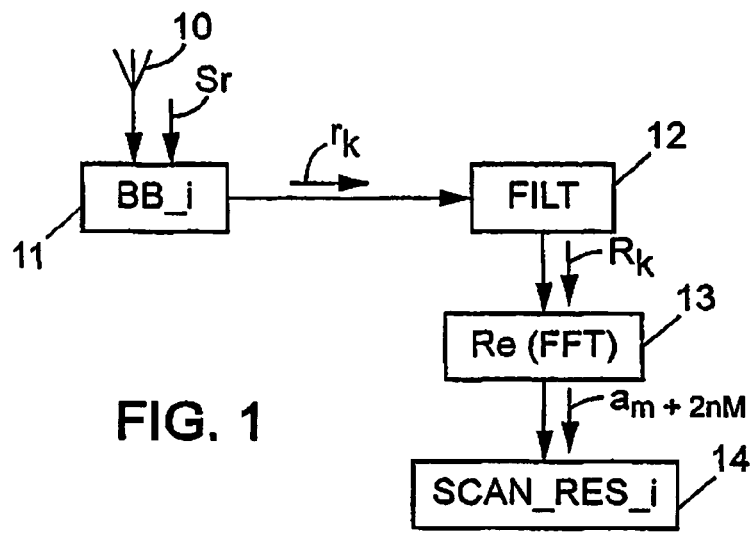
FIG. 1 illustrates processing according to the invention, with spectral scanning via FFT computation preceded by filtering.

Referring to FIG. 1, a radiofrequency signal $S_r$ is picked up by an antenna 10. A part of the signal, typically a fairly wide frequency band (e.g. several megahertz), is conventionally brought down into baseband by a tuner module 11, which amounts to "selecting" a precise band i of the signal $S_r$. The output of the module 11 delivers a series of samples $r_k$ (M samples of a symbol each time) which are then applied to the polyphase shaping filter 12, according to the following general formula:

$$R_{k+2nM} = \sum_{q=0}^{L-1} r_{k+nM+2qM} g_{k+2qM} \; k \in \{0 \ldots M-1\}$$

$$R_{k+2nM+M} = \sum_{q=0}^{L-1} r_{k+nM+2qM} g_{k+2qM} \; k \in \{0 \ldots M-1\}$$

The samples thus filtered $R_k$ are then applied to a computation module 13 which evaluates their Fourier transform according to the formula:

$$a_{m+2nM} = \sum_{k=0}^{2M-1} R_{k+2nM} e^{-12\pi \frac{km}{2M}} \; m \in \{0 \ldots 2M-1\}$$

A decision module 14 is based on the coefficients $a_{m+2nM}$ thus evaluated for obtaining an estimation of the spectrum of the signal $S_r$. This information is already useful in itself.

Figure 2:
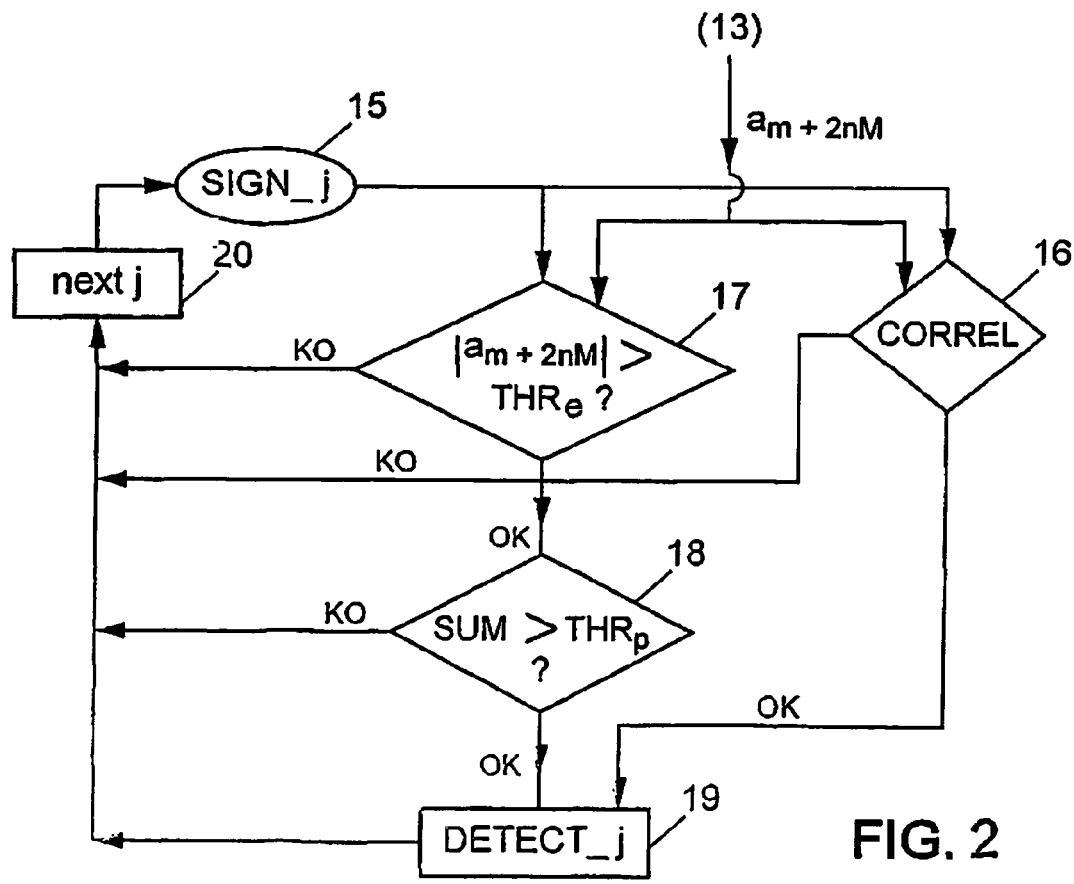
FIG. 2 illustrates schematically the detection of a signal of known signature which, advantageously, may follow the processing in FIG. 1.

Then for detecting a signal j whose spectral signature SIGN-j is known beforehand (originating for example from a memory module), processing such as that illustrated by way of example in FIG. 2 can be advantageously provided.

In particular, provision can be made to apply one of the following forms of processing or a combination of these forms of processing:

correlating the estimated spectrum (i.e. the coefficients $a_{m+2nm}$) with the spectral signature of the sought-after signal, with a correlation function relating to the whole signature or to a series of sub-parts of this signature and passing a global test criterion 16 (or a series of tests respectively), searching for a known pilot frequency, which amounts to observing whether the energy of one of the subcarriers crosses a certain threshold $THR_e$ and which is expressed by:

$|a_{m+2nM}| > THR_e$, m+2nM being set to the known pilot frequency, in the test module 17 in FIG. 2, integrating the power spectral density on a given band (by calculating for example the sum SUM of the coefficients $|a_{m+2nm}|$ or their square $|a_{m+2nM}|^2$) and looking to see whether the power spectral density crosses a threshold $THR_p$ (test module 18 in FIG. 2).

If the test or the series of tests is not satisfied (ko arrows in test output), the processing may be repeated for a following signal signature (modules 20 and 15).

On the other hand, if the test or tests prove positive (ok arrows in test output), the decision module 19 reports the detection of a signal j of spectral signature SIGN-j. To improve the signal-to-noise ratio, the computation can be repeated for different symbols.

Thus, in more general terms, the filtering and estimation of the Fourier transform according to the invention are advantageously followed by identification of a pre-specified signal.

Figure 3:
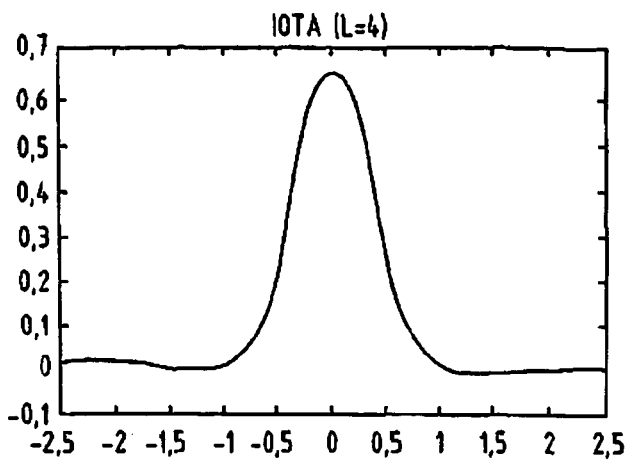
FIG. 3 shows a graph of the IOTA function as a polyphase filter bank shaping function taking place before the FFT computation, in an advantageous example of embodiment.

The performance of the spectral scanning chain, according to the invention, is described in an example below, in which the polyphase filtering shaping function taking place before the FFT computation is the IOTA function (standing for "Isotropic Orthogonal Transform Algorithm") well known in OFDM modulation technology and whose graph is shown in FIG. 3.

In the example described, the test conditions are as follows:
M=256,
L=4,
r is a pure sine wave (displaying a frequency offset of 0; 1; 10; 40% with respect to any one of the reception processing FFT carriers, relative to the intercarrier difference),
g is the IOTA function (FIG. 3).

The four FIGS. 4A to 4D then compare:
a spectral estimation by adding filtering by the IOTA function before the FFT computation, according to the invention, and
a conventional spectral estimation with a simple FFT, respectively for frequency offsets of the pure sine wave of 0; 1; 10; 40% with respect to the scanning processing FFT carriers.

The signal spectra with a conventional FFT are shown in dotted lines and the spectra of the signal with IOTA+FFT processing are shown in solid lines.

These four FIGS. 4A to 4D well illustrate the superiority of fine spectral analysis by filter bank compared with the conventional FFT approach. In particular, the dispersion of the frequency over several subcarriers in the case of simple FFT is clearly apparent in FIGS. 4B, 4C and 4D, while for IOTA+FFT processing according to the invention the energy is concentrated on a single subcarrier.

Figure 4A:
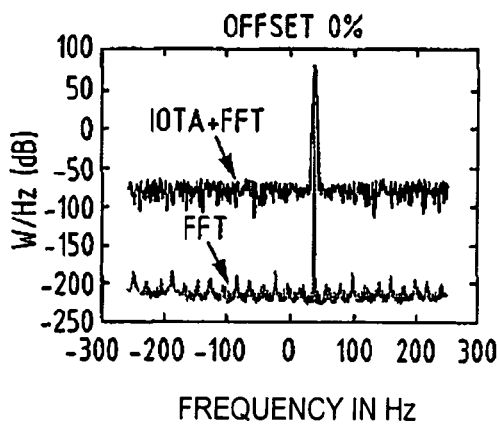
FIGS. 4A to 4D illustrate a comparison between the spectral estimation according to the invention, by adding filtering by the IOTA function before the FFT (solid lines), and conventional spectral estimation with a simple FFT (dotted lines)
Figure 4B:
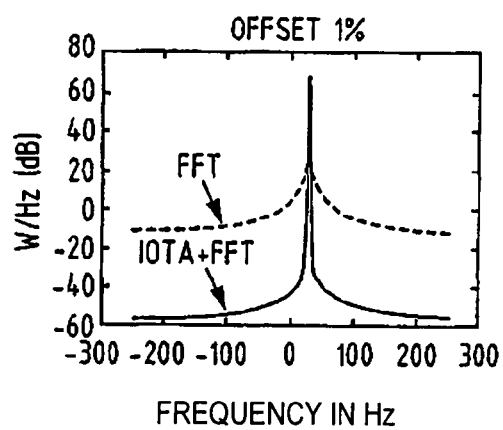
Figure 4C:
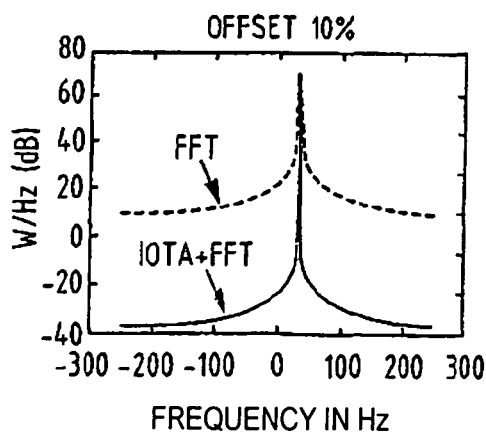
Figure 4D:
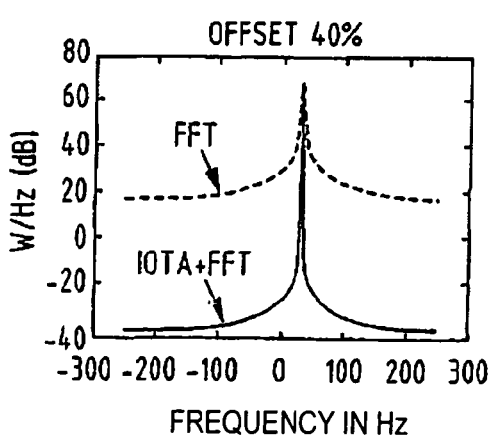

FIG. 4A illustrates a particular case where the pure sine wave is perfectly in phase with one of the carriers resulting from the FFT.

By defining a location factor L according to the formula:

$$L = \frac{|a_{p+2}|^2}{|a_p|^2}, \text{ with } p = \underset{m}{\text{argmax}}|a_m|$$

the table below, comparing the performance in terms of frequency location, of processing according to the invention (IOTA+FFT) and conventional processing (simple FFT), illustrates the superiority of processing according to the invention.

|  | Offset = 0% | Offset = 1% | Offset = 10% | Offset = 40% |
| --- | --- | --- | --- | --- |
| Simple FFT | L = −∞ | L = −46 dB | L = −25 dB | L = −12 dB |
| IOTA + FFT | L = −34 dB | L = −34 dB | L = −35 dB | L = −53 dB |

Of course, the smaller the factor L, the more finely the spectrum is characterized.

Simulations show that the IOTA+FFT scanning reproduces the pure sine wave more faithfully and that it is less sensitive to the frequency offsets between the sine wave and the scanning processing FFT carriers. This observation (made on a pure line here) may be widely applicable to any signal. Thus, it will be appreciated that implementation of the invention enables the signals present to be characterized more faithfully and more deterministically.

The document:
"*Fraction Space Multi-Carrier Modulation*", R. Vallet and K. H. Taieb, *Wireless Personal Communications* 2, 97-103, 1995, describes a theoretical method consisting in performing multicarrier shaping filtering before a Fourier transform computation.

The present invention uses this admittedly known method, but for performing spectral scanning of a received digital signal, which is in no way disclosed in the above document. The surprising advantage of this new use is to offer a faithful reproduction, e.g. of a pure sine wave as previously mentioned. This faithful reproduction further offers the advantage of being little sensitive to frequency offsets between the sine wave and the scanning processing FFT carriers. The table above clearly shows that with IOTA+FFT scanning, the location factor L is practically constant (approximately −35 dB, save for the offset of 40% which corresponds to an operating limit value, this latter ambiguity being able to be cleared up, where necessary, by applying the same scanning but offset in frequency by an intercarrier half-difference). It is also recalled that with normal FFT scanning without shaping, this factor L varies considerably. Thus, IOTA+FFT scanning enables stability in the measured pattern. Thanks to this stability, the following can be defined, as will be seen farther on:
a measurement methodology based on this scanning method,
rules of detection and operation on free frequencies, and introducing these rules into a standard.

In the aforementioned Vallet et al. document, there is no incentive to encourage the person skilled in the art to use the known method of shaping filtering followed by a Fourier transform computation for performing a spectral scan of a received signal with the aim of being less sensitive to frequency offsets.

The implementation of a processing chain according to the invention in a piece of communication equipment is now described with reference to FIGS. 5 and 6.

Referring to FIG. 5, in a first mode of embodiment, the equipment includes for example:
a tuner 51 bringing the received signal into baseband arranged downstream from an antenna 50 and covering the range of frequencies operable by the equipment,
a bank of digital filters 52 composed of an FFT 522 and, preceding it, a polyphase filter 521 enabling frequencies to be isolated (by implementing a shaping, or IOTA or Nyquist multicarrier prototype, function).

As previously described with reference to FIGS. 4A to 4D, interest in the shaping filter lies in faithfully reproducing the spectrum received, the relative levels on the FFT carriers then being respected, by being freed from the orthogonality constraints of the FFT operation alone.

This processing chain can therefore be used to perform an ambient spectrum scan and faithfully measure the spectral components. Thus, a pure line at X dB above the level of the measurable noise in an analysis band W, results from this processing chain with X dB above the level of the FFT carriers integrating the noise with a resolution W.

Referring again to FIG. 5, the processing chain 51-52 previously described may be followed by an analysis and decision chain 53-55, comprising:
a memory module 54 (static or advantageously being updatable), storing:
a set of characterization and decision-making rules,
a set of measurement conditions, and
a set of "signatures" or recorded patterns,
a spectrum analysis module 53 for identifying and characterizing received signals, using the aforementioned characterization rules and measurements carried out, and a decision or decision support module 55, based on the aforementioned rules for operating dynamically on a frequency band according to the signals detected and characterized previously.

So continuing the description of the relevant elements of the communicating equipment according to the invention, with reference to FIG. 5, an equipment reception chain comprises:

a tuner 56 operating at the frequency of the desired signal received, this frequency having been determined by the decision module 55, and a demodulator 57 of the desired signal for finally accessing the received data $DATA_R$.

The equipment further comprises a transmission chain. This chain includes a modulator 58, which operates at the frequency of the desired signal including the data to be transmitted $DATA_T$. This frequency is advantageously determined by the decision module 55. The modulator 58 is followed by a module for synthesis 59 of the desired signal, before its transmission.

In a second mode of embodiment, the spectral scanning chain and the demodulation chain on reception of the desired signal advantageously include a majority of elements in common. Actually, in this second mode of embodiment the functions of scanning and demodulation of the desired signal are separate over time. Demodulation takes place during one time segment, while spectral scanning is performed during another time segment.

FIG. 6, in which the common elements with FIG. 5 bear the same references, illustrates this second mode of embodiment. Advantageously, the implementation of this second mode of embodiment enables saving on the tuner 56 of the demodulation chain shown in FIG. 5. The tuner 61 in FIG. 6 brings the received signal into baseband and can then operate both in spectral scanning and in reception, in particular for demodulating the received signal. The decision module 65 may advantageously control this tuner 61.

Furthermore, if the desired signal demodulator performs an FFT computation, or even multicarrier filtering preceding the FFT computation, then all or part of the scanning processing hardware architecture (module 52) cam be "mutualized" (i.e. shared) with the demodulation processing of the desired signal. Finally, for ensuring non-"mutualizable" processing, it remains to add an additional module 67 (FIG. 6) for this processing of the desired signal, downstream from the FFT computation module 522, typically ensuring the demodulation of the complex symbols coming from the FFT.

Advantageously, the processing according to the invention thus enables cognitive and frequency-agile communication functionalities, based on the implementation previously described in communication equipment and by expounding rules for characterizing signals and decisions, in particular by controlling the appropriate frequency of the desired signal for transmission, determined by the decision chain.

Figure 7:
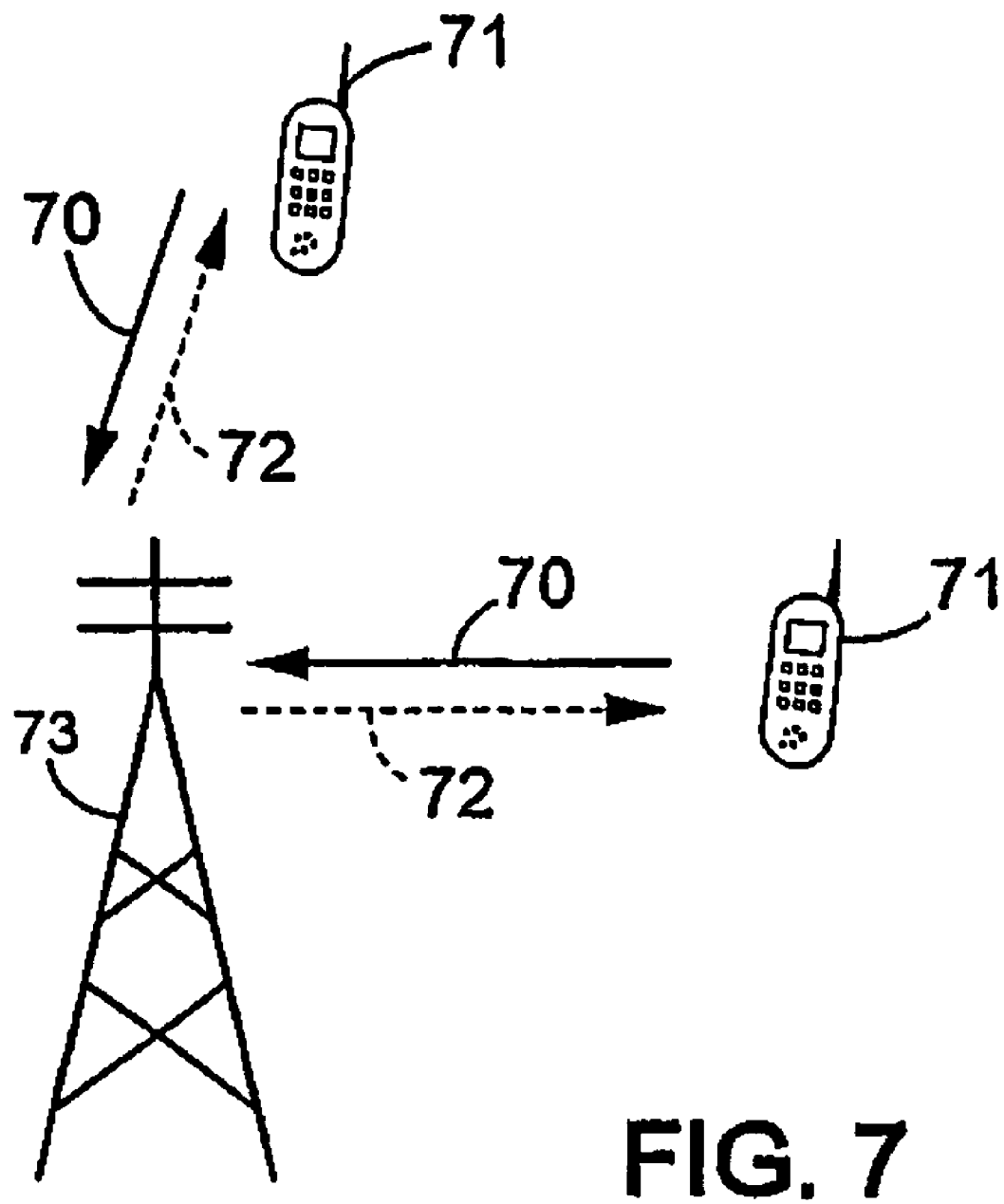
FIG. 7 illustrates an application of the method according to the invention to dynamic spectrum allocation in a context of radiocommunication of content.

For example, with reference to FIG. 7, in an application for cognitive radiocommunication of content (such as television content) and more precisely for dynamic spectrum allocation in a context of opportunistic radiocommunication typically according to the standard IEEE 802.22:

a terminal type piece of communicating equipment 71, at the disposal of a user, may perform a spectral scan, according to the present invention, searching for a free band in the television frequency spectrum (typically in a context of freeing up the TV band for cognitive radiocommunication), and thus detecting analog and digital television transmissions, the spectral information may be communicated (arrows 70) to a base station 73, which merges together the information received from all the terminals, and the base station 73 chooses a free frequency in the TV spectrum, on which it can transmit content, such that communication can then be initiated on this frequency (arrows 72 and dotted lines).

Another application could be a global cognitive radiocommunication system in which the subcarriers could cover at least a large part of the spectrum (so-called "Open Spectrum" context) and be assigned to each user without disturbing previous users.

The invention claimed is:

1. A series of modules for spectral scanning of a received digital signal, comprising a multicarrier shaping filter bank, upstream from a Fourier transform computation module;
the series of modules further comprising, downstream from the Fourier transform computation module:
a module for analysis and identification of a pre-specified signal, based on predefined characterization rules, and
a decision module, downstream from the analysis and identification module, indicating at least one operating frequency band of a piece of communicating equipment, in reception and/or in transmission.

2. A communicating equipment comprising, a series of modules for spectral scanning of a received digital signal, the series of modules including a multicarrier shaping filter bank, upstream from a Fourier transform computation module;
the communication equipment further comprising a series of modules for reception, with demodulation, and/or a series of modules for transmission, with modulation, and comprising, downstream from the Fourier transform computation module, an analysis and identification module and a decision module indicating at least one operating frequency band in demodulation and/or in modulation.

3. The communicating equipment as claimed in claim 2, further comprising, upstream from the filter bank, a module bringing the received signal into baseband and for demodulating the received signal and operating spectral scanning of said received signal.

4. The communicating equipment as claimed in claim 2, wherein the communicating equipment operates as a base station of a communication system.

5. The communicating equipment as claimed in claim 2, wherein the communicating equipment operates as a terminal of a communication system.

6. A communication system, in a cognitive and frequency-agile communication context, comprising communicating equipment as claimed in claim 2, wherein the communicating equipment operates as one of:
a base station;
a terminal; or
a based station and terminal.

* * * * *